(12) United States Patent
David et al.

(10) Patent No.: US 7,314,116 B2
(45) Date of Patent: Jan. 1, 2008

(54) WALKIE/RIDER TRUCK

(75) Inventors: Bernd David, Henstedt-Ulzburg (DE); Dietrich Vahldiek, Henstedt-Ulzburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 423 days.

(21) Appl. No.: 10/977,685

(22) Filed: Oct. 29, 2004

(65) Prior Publication Data

US 2006/0090967 A1  May 4, 2006

(51) Int. Cl.
*B62D 51/04* (2006.01)
*B62D 1/14* (2006.01)

(52) U.S. Cl. .............. 187/231; 180/19.2; 180/19.3

(58) Field of Classification Search ............. 187/231, 187/233, 222; 180/332, 333, 334, 315, 19.1, 180/19.2, 19.3
See application file for complete search history.

(56) References Cited

U.S. PATENT DOCUMENTS

| | | | | |
|---|---|---|---|---|
| 3,791,474 A | * | 2/1974 | Stammen et al. ........... 180/332 |
| 4,287,966 A | * | 9/1981 | Frees ......................... 187/231 |
| 4,444,284 A | * | 4/1984 | Montemurro .............. 180/19.1 |
| 4,716,980 A | * | 1/1988 | Butler ........................ 180/19.2 |
| 4,942,529 A | * | 7/1990 | Avitan et al. ................. 701/50 |
| 5,245,144 A | * | 9/1993 | Stammen ................. 200/61.85 |
| 5,595,259 A | * | 1/1997 | Gilliland et al. ............ 180/332 |
| 5,964,313 A | * | 10/1999 | Guy ............................ 180/332 |
| 6,382,359 B1 | * | 5/2002 | Lohmann ..................... 187/231 |
| 6,464,025 B1 | * | 10/2002 | Koeper et al. ............. 180/19.2 |
| 6,595,306 B2 | * | 7/2003 | Trego et al. ............... 180/19.2 |
| 6,883,625 B2 | * | 4/2005 | Trego et al. ............... 180/19.2 |
| 6,948,739 B2 | * | 9/2005 | Gallagher et al. .......... 280/770 |
| 7,025,157 B2 | * | 4/2006 | Lindsay et al. ............ 180/19.2 |
| 7,134,515 B2 | * | 11/2006 | Lenkman ...................... 180/11 |
| 2003/0029647 A1 | * | 2/2003 | Trego et al. ............... 180/19.1 |
| 2005/0016779 A1 | * | 1/2005 | Lindsay et al. ............ 180/19.3 |
| 2005/0150708 A1 | * | 7/2005 | Lohmann et al. ........... 180/332 |

FOREIGN PATENT DOCUMENTS

EP  1125819  8/2001

* cited by examiner

*Primary Examiner*—Lincoln Donovan
*Assistant Examiner*—Eduardo Colon
(74) *Attorney, Agent, or Firm*—Vidas, Arrett & Steinkraus, P.A.

(57) ABSTRACT

A walkie/rider truck which has a platform at the rear of the truck body and a holding bar to be grasped by one hand of the operator standing on the platform. A switch box is attached to the holding bar and houses at least one key switch in order to switch the driving control means into a creeping mode. This switch is also provided to switch a driving control means into a fast travel mode.

7 Claims, 3 Drawing Sheets

WALKIE/RIDER TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Such a truck is for example disclosed by U.S. Pat. No. 6,382,359 B1. It comprises a driving portion including a truck body and a load bearing means for receiving and bearing a load. A platform is attached to the truck body so that an operator selectively can stand on the platform or may walk aside the truck. A steering arm is linked to the truck body and is pivotable about a horizontal axis. The steering arm is also rotatable about a vertical axis. By the rotation about the vertical axis a steerable wheel of the truck is steered. The steering arm includes a steering rod, a steering head being connected to one end of the steering rod. Individual control elements are provided at the steering head to actuate the truck. For example a travel switch is provided at the steering arm, e.g. in the form of a manual grip which is rotatable about its longitudinal axis and can rotate from a neutral position to a desired value for the speed of the driving motor for the truck.

In connection with such a truck it is also known to attach a bail-shaped handle above the truck body which extends transverse to the longitudinal axis of the truck and which can be grasped with one hand when the operator stands on the platform while the other hand grasps the steering head. It is also known to attach a switch box to the handle which includes at least one key switch. The key switch can be provided in addition to control elements and switches of the steering head, for example to actuate the load bearing means, the horn or the like.

From EP 1 125 819 B1 it has become known to provide a steering arm-actuated truck wherein the steering arm defines braking ranges in two angular end positions, i.e. in the upper approximately upright position and the lower approximately horizontal position. In these angular ranges a braking device of the truck is actuated. Despite an actuation of the travel switch the truck cannot be moved in this operational condition. From this publication it has also become known to provide a specific additional travel switch at the steering arm. Upon actuation of the specific travel switch the truck can be also driven although the steering arm is in one of the braking ranges, however, with reduced acceleration. The maximum speed of the truck, however, is not limited with actuated specific travel switch.

BRIEF SUMMARY OF THE INVENTION

The invention provides a walkie/rider truck wherein with one actuation element two different operational conditions for the truck can be effected.

In accordance with the above described truck the truck according to the invention includes a bail-shaped handle or holding bar with a switch box which has at least one key switch. The key switch is connected with the control means for the driving means and the braking means. If the key switch is actuated outside of the braking ranges of the steering arm, the truck can be accelerated to a relatively high speed e.g. up to 12 km/h. In this case the driving motor of the truck is in the highest or second speed mode. If the truck is controlled without actuation of the key switch only by the travel switch the driving motor is in the first speed mode having speed values below the speed values of the second speed mode. If the key switch is actuated when the steering arm is in the upper braking range, the driving motor is brought into the creeping mode wherein the maximum speed in both travel directions is limited to for example 1,5 km/h. The creeping mode can be only reached if upon actuation of the key switch in the upper braking range of the steering arm the travel switch is in its neutral position. A creeping travel is only possible if the travel switch has been previously brought into the neutral position. It is, however, conceivable to neglect the neutral position of the travel switch and to initiate the creeping mode independent of the sequence of the actuation of the key switch and the travel switch if the key switch is actuated the steering arm is in the upper braking range. Furthermore, the order of succession of the actuation of the key switch and the travel switch, respectively, can be changed provided the travel switch has been first brought to the neutral position.

According to an embodiment of the invention, the acceleration of the driving motor in the creeping mode is significantly smaller than in the first or second speed mode, e.g. reduced to 50%.

In the invention it is possible either to permanently actuate the key switch or only for a limited time. If the key switch is permanently actuated and released during the creeping mode, the driving motor is automatically switched to the idle mode. In order to achieve the first or second speed mode, the travel switch first must be brought into the neutral position if not already being in this position.

The key switch is arranged such that it can be actuated by the thumb of the hand which grasps the holding bar. The operator, thus, can actuate the key switch without releasing the holding bar. To this purpose it is according to an embodiment of the invention advantageous if the switch box is attached to the lower side of the holding bar.

Further actuation elements can be provided in the switch box, e.g. a key switch for the actuation of the load bearing means or the horn.

BRIEF DESCRIPTION OF THE DRAWINGS

An advantageous formation of the invention is described in more detail by way of subsequent drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated

DETAILED DESCRIPTION OF THE INVENTION

Figure 1:
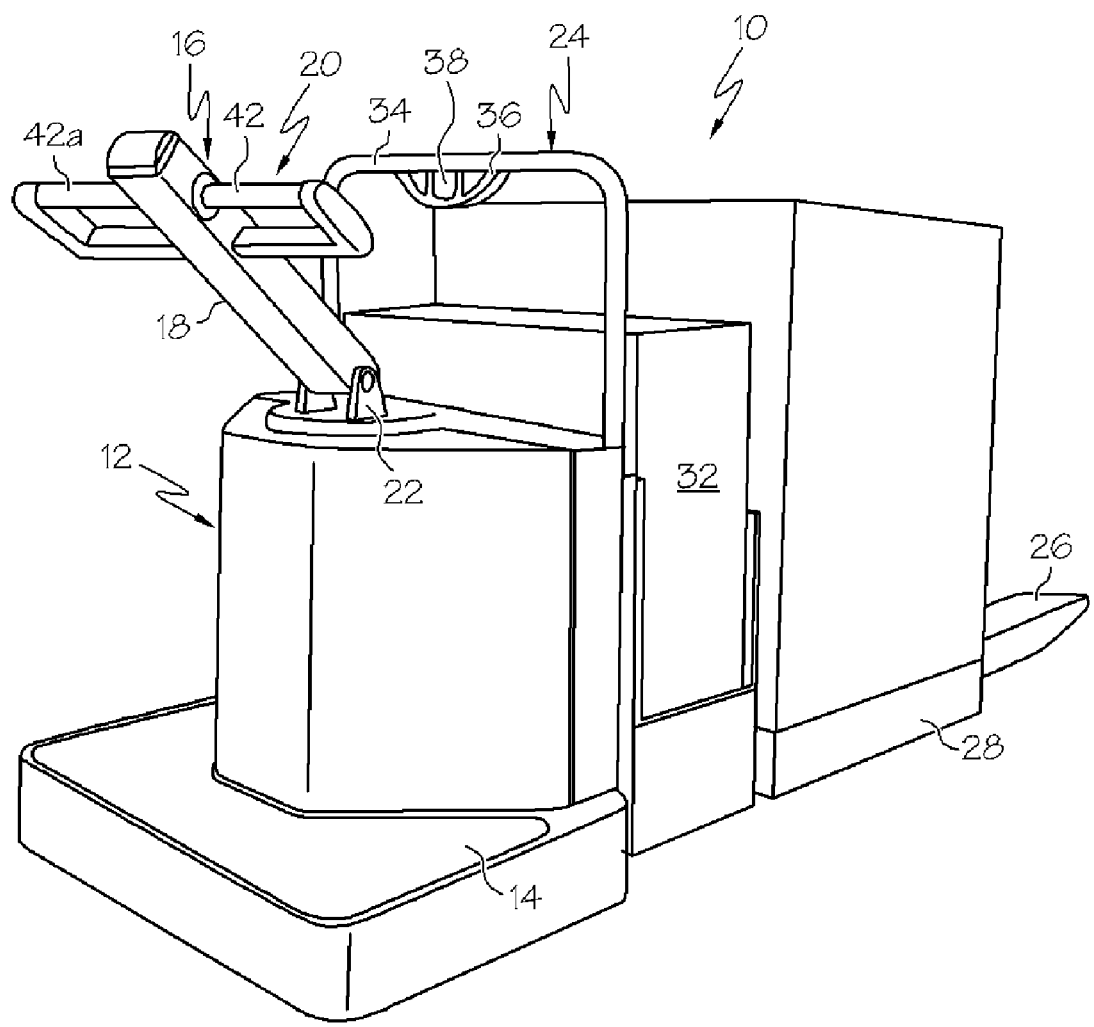
FIG. 1 is a diagrammatic view of a truck according to the invention.

FIG. 1 shows a walkie/rider truck 10 as for example has become known from the U.S. Pat. No. 6,382,359. It includes a truck body 12, and a platform 14 provided at the rear of the truck body. A steering arm 16 is linked to the upper side of the truck body 12 and has a steering rod 18 and a steering head 20. The steering rod 18 is pivotally supported about a horizontal axis at the upper side of truck body 12. Furthermore, the steering arm 16 can be rotated about a vertical axis for steering a not shown steerable wheel of truck 10. A reverse U-shaped holding bar 24 is provided at the upper side of the truck body 12. The operator may grasp the holding bar 24 with one hand if he stands on the platform 14. He can selectively stand on the right or left side of platform 14 depending upon whether he is right- or left-handed. If he stands on the right side, he seizes bar 24 with his right hand and actuates the steering head 20 with his left hand. If he stands on the left side of platform 14, it is vice versa.

At the front side of the truck a load bearing means in form of a bearing fork is provided, one tine of the fork can be seen at 26. The bearing fork accommodates a pallet 28 upon which a load is arranged. A battery 32 is located between the load bearing means and the truck body 12.

The truck 10 includes a not shown driving motor controlled by driving control means also not shown. The driving control means are controlled from the steering head 16. Furthermore, driving means to lower or elevate the load bearing means are provided. Such a driving means are also not shown. Finally, the truck has braking means for the driven wheel. The braking means is actuated by braking control means. The braking control means inter alia are controlled by the steering arm 16 in an upper approximately vertical angular range and in a lower approximate horizontal angular range. Thus, the truck cannot be moved if the steering arm 16 is in one of these angular ranges. Details of this specific braking control are not to be described in detail. They are generally known by the already mentioned U.S. Pat. No. 6,382,359 B1 or the EP 1 125 819 B1.

As can be seen in FIG. 1 a switch box 36 is arranged at an approximately horizontally extending rod 34 of holding bar 24. The switch 36 box is attached to the lower side of the holding bar and is inclined downwardly. The switch box 36 includes a key switch arrangement 38. The key switch arrangement 38 has a central key switch 40, a left key switch 42 and a right key switch 44. The left key switch 42 serves to actuate the elevating and lowering of the load bearing means of truck 10. The right key switch 44 for example actuates a horn. The central key switch 40 is a high-speed key switch. If during normal travel the key switch 40 is actuated for a short duration or permanently, the driving motor of truck 10 is brought into the second speed mode wherein the truck can be accelerated to a maximum speed, e.g. 12 km/h. If the key switch 40 is not actuated, the truck 10 travels with lower speed and can only be accelerated to a maximum speed of for example 6 km/h.

In the shown truck the key switch 40 has a further function if the steering arm 16 is in the upper braking range. If in this position of the steering arm the key switch 40 is actuated, the driving control means is brought into a creeping mode. In this creeping mode the truck can be accelerated for example to a maximum speed of 1,5 km/h. Thus, the key switch 50 serves for two functions, with the creeping mode having the effect that the truck can be travelled and maneuvered also with the steering arm in the upright position. Frequently it is not possible to pivot the steering arm 16 downwards in a brake-free range owing to an obstacle near the truck.

If the truck 10 is to be brought from the creeping mode into the first or second speed mode, first the travel switch—in FIG. 1 one of the grips 42 of the steering head 20—is to be brought into a neutral position before the truck can be accelerated by rotating one of the grips 42. In order to accelerate the driving motor, one of the grips 42 is rotated about its longitudinal axis, with the travelling direction be determined by the rotational direction of the grip. This is known for such steering heads.

It has already been mentioned that the key switch arrangement 38, in particular key switch 40, can be actuated by the thumb of the hand which grasps the holding bar 34. The operator must not release the holding bar in order for example to switch into the creeping mode.

Figure 2:
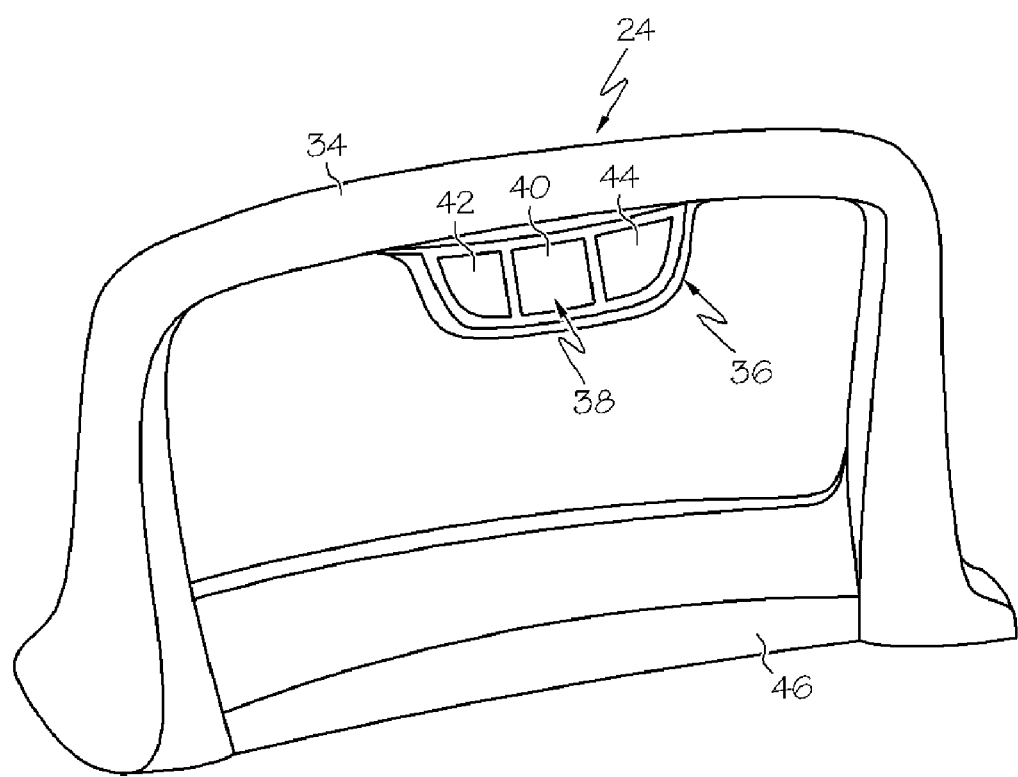
FIG. 2 is an enlarged detail of the truck of FIG. 1.
Figure 3:
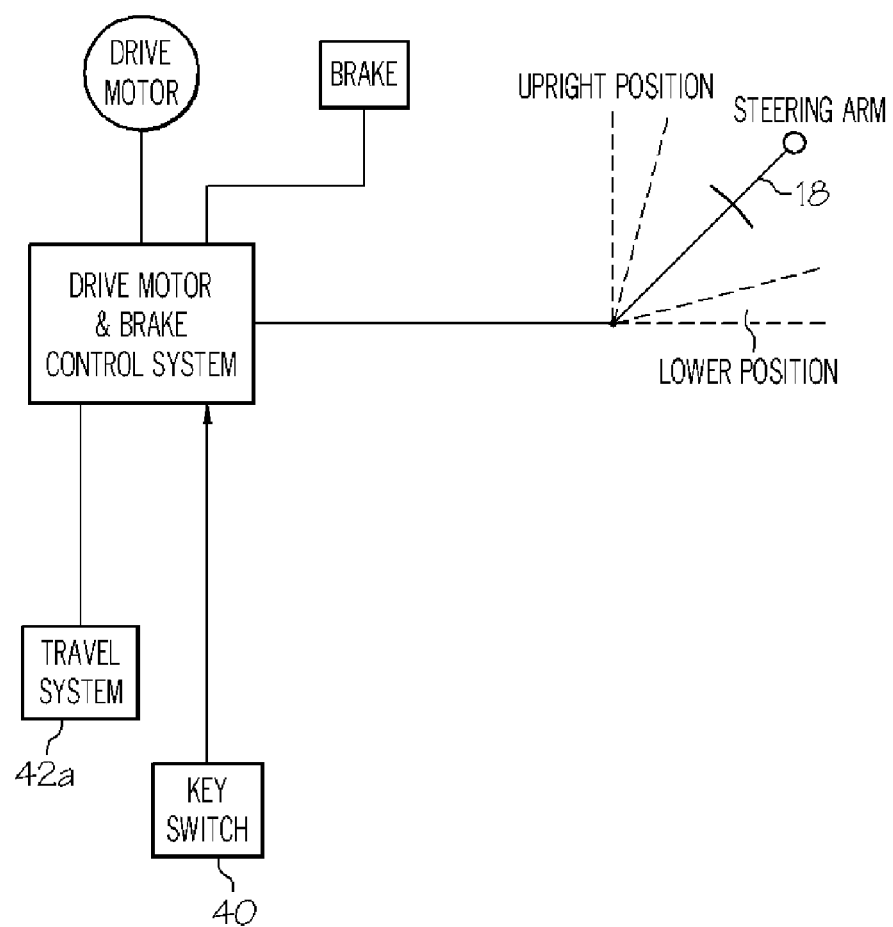
FIG. 3 is an illustration of the interrelation of parts of the truck.

In FIG. 2 it can be seen further that the holding bar 24 and a lower transverse bar 46 form a unit which can be formed of plastic material and can be attached to the upper side of truck body 12. The kind of fastening is not shown. A housing for the switch box 36 can be formed separately or can be formed integrally with bar 34. The electrical connections between the key switches 40 to 44 to the mentioned control means can be located within the holding bar 24 which may be hollow. This is also not illustrated.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A walkie/rider truck comprising:
a truck body,
a driving motor in the truck body,
control means for the driving motor,
load bearing means,
a platform at the rear of the truck body for an operator,
a steering arm with two ends one being a first end and one being a second end,
a steering head,
a holding bar,
at least one travel switch,
a switch box, and
braking means, wherein:
the first end of the steering arm for steering purposes is supported by the truck body for rotation about a vertical axis and for pivoting about a horizontal axis, the steering arm has an upper upright position range and a lower approximately horizontal position range which define braking ranges, the steering head is connected to the second end of the steering arm, the control means for the driving motor provides a creeping mode, a first speed mode defining speeds higher than those of the creeping mode and a second speed mode defining speeds above those of the first speed mode, the at least one travel switch is on the steering head is connected to the drive control device and is for controlling the speed of the driving motor, the travel switch has a neutral position and at least one actuation position, the holding bar is on the truck body and extends transverse to the longitudinal axis of the truck and can be grasped by the operator by one hand if the operator stands on the platform while the operator's other hand grasps, the steering head, the braking means inter alia are actuated by braking control means, the switch box is attached to the holding bar and has, at least one key switch which has a neutral position and an actuation position, the key switch is connected to the driving control device and the braking control means, when the steering arm is in one of the braking ranges, upon actuation of the key switch from the neutral position to the actuation position the driving motor is accelerated within the second speed mode, when the steering arm is in a position outside of the braking ranges upon an actuation of the key switch from the neutral to the actuation position, the driving motor is brought into the creeping mode when the steering arm is in the upper braking range and the travel switch is actuated from the neutral to the actuation position, the speed in the creeping mode is also controlled by the position of the travel switch.

2. The walkie/rider truck of claim 1, wherein the acceleration of the driving motor in the creeping mode is significantly smaller than in the first or the second speed mode.

3. The walkie/rider truck of claim 1, wherein the key switch to effect the creeping mode must be permanently actuated.

4. The walkie/rider truck of claim 3, wherein upon release of the key switch in the creeping mode the driving motor is switched into an idle mode, and the travel switch must be brought primarily into a neutral position to effect the first or second speed mode.

5. The walkie/rider truck of claim 1, wherein on both sides of a centrally located key switch further key switches are located for the actuation of the load bearing means and a horn.

6. The walkie/rider truck of claim 1, wherein the key switch is arranged such that it can be actuated by the thumb of the hand which grasps the holding bar.

7. The walkie/rider truck of claim 1, wherein the switch box is attached to the lower side of the holding bar.

* * * * *